No. 710,063. Patented Sept. 30, 1902.
H. LEMP.
AUTOMOBILE.
(Application filed Mar. 28, 1900.)
(No Model.) 3 Sheets—Sheet 3.

Witnesses.
Edward Williams, Jr.
A. F. Macdonald.

Inventor.
Hermann Lemp,
by Albert G. Davis
Atty.

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

AUTOMOBILE.

SPECIFICATION forming part of Letters Patent No. 710,063, dated September 30, 1902.

Application filed March 28, 1900. Serial No. 10,448. (No model.)

*To all whom it may concern:*

Be it known that I, HERMANN LEMP, a citizen of the United States, residing at Lynn, county of Essex, State of Massachusetts, have invented certain new and useful Improvements in Automobiles, (Case No. 1,258,) of which the following is a specification.

The present invention has for its object to provide a frame for vehicles which is simple in construction and is capable of holding the axles in their proper alinement under all conditions of road, yet at the same time permitting a certain amount of flexibility.

Figure 1:
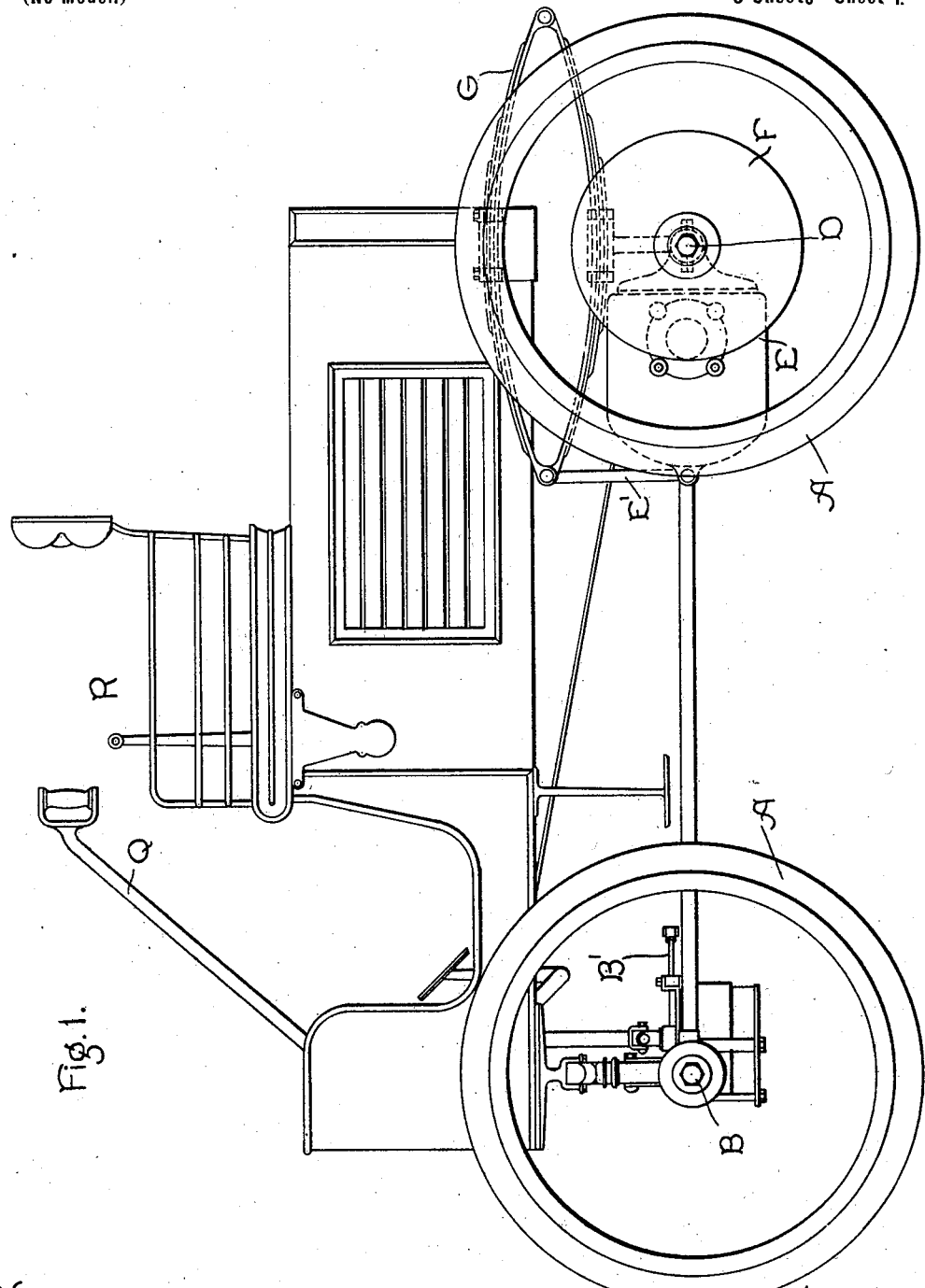
Figure 2:
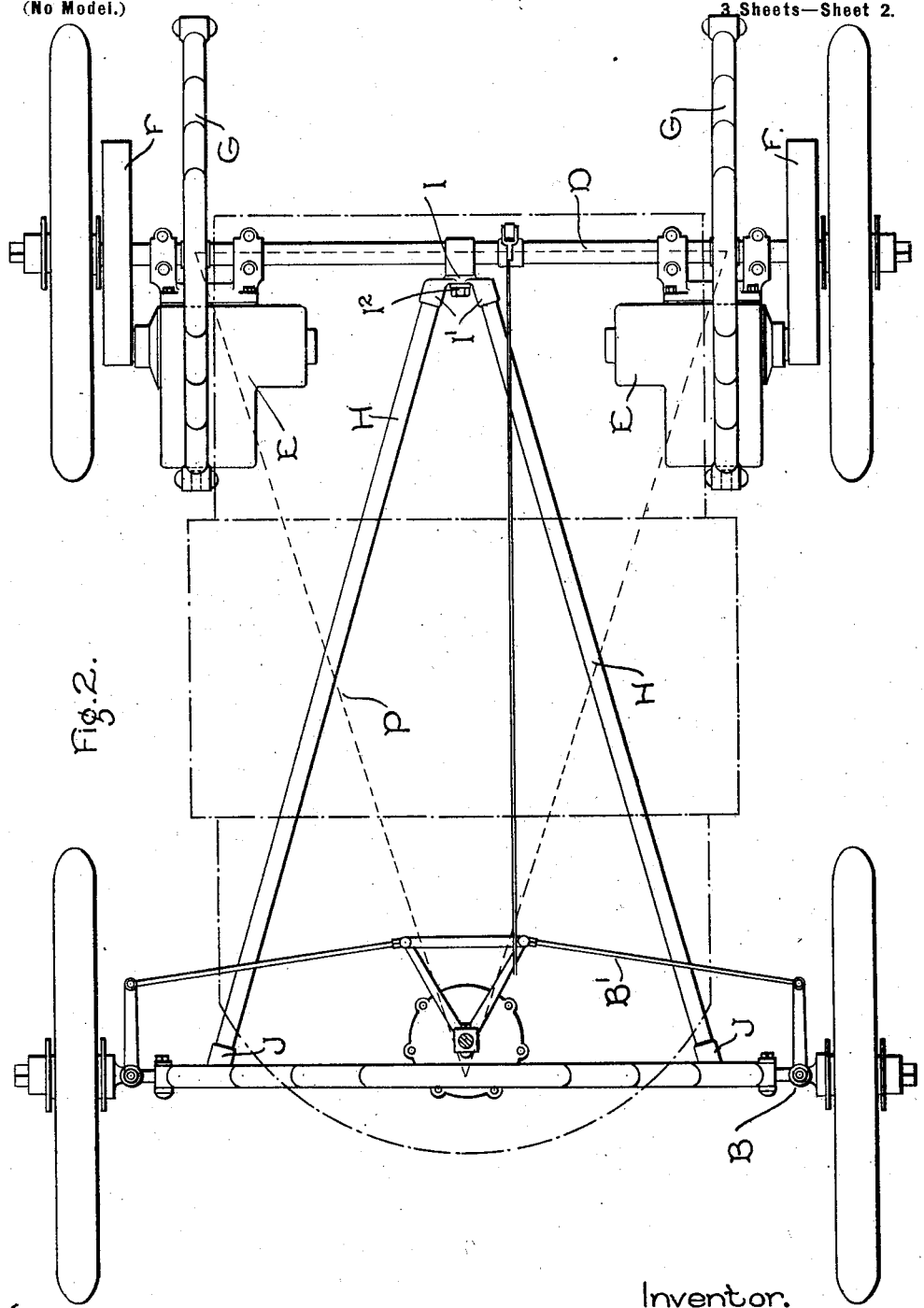
Figure 3:
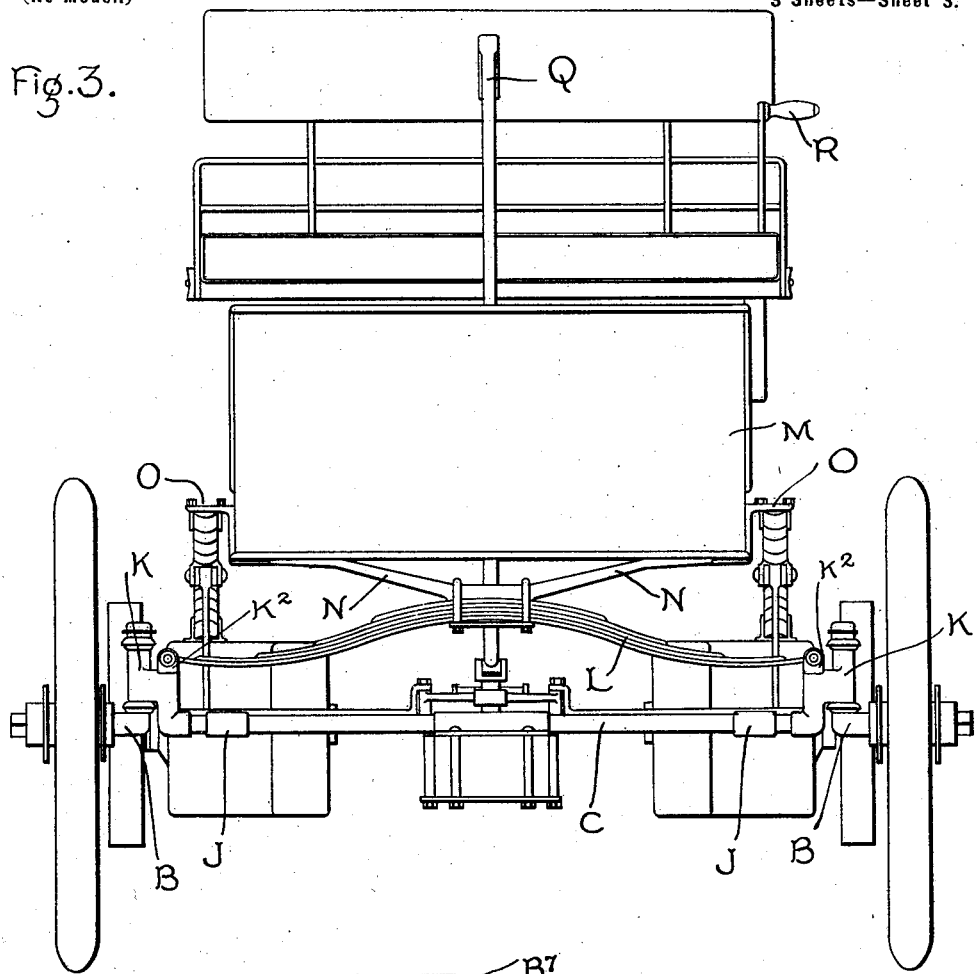
Figure 4:
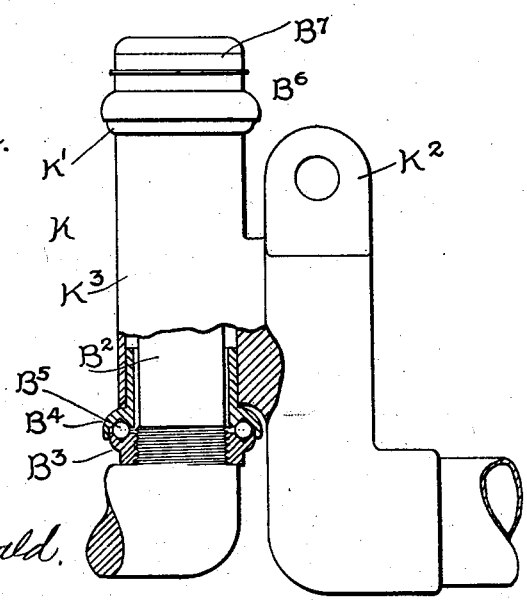

In the accompanying drawings, which show an embodiment of my invention, Figure 1 is a side elevation of a vehicle. Fig. 2 is a plan view of the same with the body removed. Fig. 3 is a front elevation, and Fig. 4 is a detail view, of a bearing for the steering-wheel.

In all vehicles, and particularly those which are self-propelled, it is necessary to have a certain amount of flexibility between the front and rear axles, so as to compensate for irregularities in the road. The ideal construction for flexibly tying two axles together is to use two overlapping triangular frames and connect the apex of each frame to the base of the other with a swivel-joint. For certain reasons it is undesirable to make a frame of this particular construction; but I obtain the advantage thereof by a slight modification, which will be hereinafter described.

In the drawings, A represents the wheels, the front or steering wheels being connected to short axles B, which in turn are connected to the fixed front axle C, while the rear wheels are mounted directly on the rear axle D. The short front axles are made in the form of bell-crank levers, one portion entering the wheel-hub, the other portion extending rearwardly and connecting through a rod B' with the steering-handle Q. In addition to the above each of the short front axles is provided with a vertically-extending bearing-stud $B^2$. Referring to Fig. 4, the construction will be clearly seen. The lower end of the bearing-stud $B^2$ is screw-threaded, and mounted on this screw-threaded portion is a sleeve $B^3$, containing a ball-race. Situated directly over this sleeve is a second sleeve $B^4$, which also contains a ball-race, and between the two are the balls $B^5$. The upper sleeve $B^4$ is provided with an external shoulder, and seated on this shoulder is the tubular portion of the frame K. The upper end of the tubular frame is provided with a ball-race K', and a corresponding ball-race $B^6$ is mounted on the vertical stud $B^2$ and retained in place by the adjusting-nut $B^7$.

In the present instance two electric motors E are employed for driving, one being mechanically connected by gearing to one of the rear wheels and the other to the opposite rear wheel. The gearing is inclosed in suitable gear-cases F. The motors are sleeved on the axle at the rear end and are supported by links E' at the nose end, the said links being connected to the full elliptic springs G at the point of union between the upper and lower halves. By this arrangement the motors are partially supported by the rear axle and partially by the vehicle-body and springs. It will be seen that each motor is provided with two bearings, which are sleeved on the rear axle, and that they are located on opposite sides of the springs G and their retaining-clamps. By reason of this arrangement each motor is supported by the link E' at a point which is in line with its center of gravity, or approximately so.

Electric motors are described as furnishing the motive power; but it is to be understood that any other form of propelling agent may be employed without departing from the spirit of my invention.

Referring more particularly to Fig. 2, it will be seen that the front and rear axles are connected by a frame composed of two tubes H, which, together with the front axle, form a triangle, and that the point of connection of the tubes, or, in other words, the apex of the triangular frame, is connected by a swivel-joint I to the rear axle. The front or diverging ends of the tubes are connected to the front axle at widely-separated points by rigid clamps or couplings J. The swivel-joint I consists of a band or clamp which is rigidly secured to the axle D and the fork I', to which the ends of the tubes are connected. The fork is pivotally secured to the clamp by a bolt $I^2$, so that it is free to twist around a horizontal axis as the front wheels pass over irregularities in the road. This arrangement also permits one of the rear wheels to rise and fall with respect to the other, as in passing over an obstruction, without in any way straining the frame. In other words, the axles and wheels are arranged to move in parallel vertical planes with respect to each other.

Rigidly secured to the rear axle and extending parallel with the wheels are two full-elliptic springs G. This I have found to be a desirable construction, as they are rigid against lateral motion, while permitting the vehicle to move freely in a vertical direction; but any other arrangement of springs may be utilized, providing means are employed to prevent any substantial amount of lateral movement of the vehicle-body independent of the frame.

Rigidly secured to the ends of the fixed front axle are two frames or hangers K, Figs. 3 and 4, and mounted in these frames and extending parallel with the axle is a half-elliptic spring L. This spring is rigid against a forward or backward thrust, but permits the vehicle-body M to move freely up and down. If desired, a full-elliptic spring may be employed, or a spring of any other type, so long as means are provided to prevent any substantial amount of horizontal movement of the body independent of the frame.

Depending from and secured to the front end of the body is a frame-piece N, having enlarged ends, and to this frame is rigidly secured the spring L. Bolted to opposite sides of the body near the rear end are two brackets O, and clamped in these brackets are the elliptic springs G. The vehicle-body forms, in effect, a second triangular frame, with its apex connected to the base of the lower triangular frame through a spring, while the rear of the body or base of the triangle is connected by springs G with the fixed rear axle, to which is secured the apex of the lower triangular frame. From an inspection of Fig. 2 this feature will be apparent. The vehicle-body is shown in outline by a broken dotted line, which body is supported at three points—two in the rear and one in the front. Connecting these points of support is a dotted line P, and it will be seen that the two overlapping triangles are formed, one being the frame composed of the tubes H, the other being the vehicle-body. It is true that the body is not triangular in shape, yet the effect of a triangular frame is produced by reason of its being supported at three points.

The frame when constructed as above described is very light and strong and will permit the parts to have a certain freedom of movement to compensate for irregularities in the road, and by securing the body directly to the springs I am enabled to dispense with a second metal frame commonly employed in vehicles of the class to which the invention pertains.

Referring more particularly to Fig. 4, the front axle is tubular and at the end is provided with a frame or hanger K, which is provided with two vertical and parallel extending portions $K^2$ and $K^3$. The former is solid and is forked at the upper end to receive the end of the front spring L, while the latter is tubular and forms a support for the ball-bearings for the axle-bearing stud $B^2$.

The controlling of the vehicle is accomplished by means of a controller located under the seat, and by changing the position of the handle R the speed can be varied from lowest to highest speeds in a forward or backward direction.

What I claim as new, and desire to secure by Letters Patent of the United States, is—

1. The combination, in a vehicle, of fixed front and rear axles, a triangular frame rigidly connected at two points with the front axle and pivotally connected at a single point to the rear axle, driving-wheels, and motors supported on the rear axle and located between the pivotal point of the triangular frame and the driving-wheels.

2. In a vehicle, the combination of front and rear axles both of which are fixed, short movable axles pivotally secured to the front axle, a triangular frame which is rigidly secured at two points to the front axle and at its point or apex to the rear axle, unions or couplings for uniting the frame with the fixed axle, a clamp on the rear axle for pivotally supporting the apex of the frame, and a driving-motor sleeved on the rear axle and mechanically connected to a driving-wheel.

3. In a vehicle, the combination of a fixed front axle, a fixed rear axle, a triangular frame, a clamp on the rear axle to which the apex of the triangular frame is secured by a horizontal pivot, couplings on the front axle which are widely separated for receiving and holding the diverging ends of the frame, and a motor sleeved on the axle, to which the frame is pivotally secured.

4. In a vehicle, the combination of fixed front and rear axles, a triangular frame rigidly connected to the front axle at two points and pivotally connected to the rear axle at one point, a vehicle-body, a single spring secured to the front axle and to the body, which spring extends parallel with the axle, a pair of springs secured to, and extending at right angles to, the rear axle for supporting the rear end of the body, and motors mounted one on each side of the pivotal connection.

5. In a vehicle, the combination of two axles, a triangular frame rigidly connected to the front axle at two points and pivotally connected to the rear axle at one point, steering-wheels carried by the front axle, a vehicle-body, a single transversely-extending spring secured to the front axle and to the vehicle-body, a pair of longitudinally-extending springs connected to the rear axle, and motors supported by the rear axle and the longitudinally-extending springs.

6. In a vehicle, the combination of a pair of fixed axles, a triangular frame, a pair of unions for rigidly connecting the diverging ends of the triangular frame with the front axle, a fork for connecting the converging ends of the frame, a clamp on the rear axle, a pivotal connection between the fork and the clamp, a vehicle-body, a single spring mounted on the front axle for supporting the vehicle-body at that point, and a pair of springs extending at right angles to the rear axle and connected to said axle and to the body.

7. In a vehicle, the combination of a front and a rear axle, steering-wheels pivotally secured to one of the axles, a triangular frame the diverging ends of which are rigidly secured to one axle while the opposite ends of the frame are united by a fork, a band or clamp which surrounds the other axle, and a pivot which is mounted in the band or clamp and extends at right angles to the rear axle and engages with the fork for fastening the triangular frame in place.

8. In a vehicle, the combination of a fixed axle, a short steering-axle having a stud thereon, and a frame or hanger rigidly mounted on the fixed axle, comprising two vertically-extending portions, one of said portions being adapted to receive one end of a leaf-spring, the other portion being tubular and arranged to receive the stud of the short steering-axle.

9. As an article of manufacture, a hanger for vehicles, comprising two vertically-extending portions, one of said portions being provided with an opening for receiving a fixed support, and a fork for receiving the end of a leaf-spring, the other portion being tubular and adapted to receive and form a bearing for the steering-axle stud.

In witness whereof I have hereunto set my hand this 26th day of March, 1900.

HERMANN LEMP.

Witnesses:
DUGALD MCKILLOP,
CHAS. B. BETHUNE.